(12) United States Patent
McMullen et al.

(10) Patent No.: US 9,420,425 B1
(45) Date of Patent: Aug. 16, 2016

(54) METHODS AND SYSTEMS FOR DETERMINING A CHANGE IN LOCATION OF A PORTABLE WIRELESS ACCESS POINT

(71) Applicant: Sprint Spectrum L.P., Overland Park, KS (US)

(72) Inventors: Michael P. McMullen, Leawood, KS (US); Roger D. Bartlett, Merriam, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 14/842,294

(22) Filed: Sep. 1, 2015

(51) Int. Cl.
*H04W 64/00* (2009.01)
*H04W 4/02* (2009.01)
*H04W 4/22* (2009.01)

(52) U.S. Cl.
CPC ................ *H04W 4/025* (2013.01); *H04W 4/22* (2013.01)

(58) Field of Classification Search
CPC combination set(s) only.
See application file for complete search history.

(56) References Cited

U.S. PATENT DOCUMENTS

| | | | |
|---|---|---|---|
| 7,245,900 B1 | 7/2007 | Lamb | |
| 7,433,673 B1 | 10/2008 | Everson | |
| 7,602,886 B1 | 10/2009 | Beech | |
| 7,907,579 B2 | 3/2011 | FitzGerald | |
| 8,265,068 B2 | 9/2012 | Olshanksy | |
| 8,289,958 B1 | 10/2012 | Narayanan | |
| 8,743,782 B1 | 6/2014 | Patel | |
| 8,805,403 B2 | 8/2014 | Curticapean | |
| 2008/0076398 A1* | 3/2008 | Mate | C03C 17/09 455/414.2 |
| 2009/0129291 A1* | 5/2009 | Gupta | H04W 8/26 370/254 |
| 2010/0159949 A1* | 6/2010 | Selgert | H04W 64/003 455/456.1 |
| 2014/0171015 A1 | 6/2014 | Choi-Grogan | |

* cited by examiner

*Primary Examiner* — Quan M Hua

(57) ABSTRACT

A portable wireless access point (WAP) stores its location and is configured to report the stored location to a location-based service provider (LBSP) when a wireless communication device (WCD) is within coverage of the portable WAP and requests a location-based service from the LBSP. While the WCD is within coverage of the portable WAP, the portable WAP receives from the WCD a first list of one or more cellular base stations currently accessible by the WCD. Thereafter, while the WCD is again within coverage of the portable WAP, the portable WAP receives from the WCD a second list of one or more cellular base stations currently accessible by the WCD. The portable WAP compares the first list to the second list, and responsive to determining that the second list is threshold different from the first list, the portable WAP reconfigures itself such that, when the WCD requests the location-based service, the portable WAP does not report the stored location to the WCD.

20 Claims, 4 Drawing Sheets

METHODS AND SYSTEMS FOR DETERMINING A CHANGE IN LOCATION OF A PORTABLE WIRELESS ACCESS POINT

BACKGROUND

An example wireless network may include a wireless access point (WAP) that defines a wireless coverage area in which wireless communication devices (WCDs) such as cell phones, tablet computers, tracking devices, embedded wireless modules, and other wirelessly equipped communication devices, can operate. In turn, such a WAP may be coupled with network infrastructure that provides connectivity to a packet-switched network, such as the public switched telephone network (PSTN) and/or the Internet for instance. In practice, the WAP may assign an Internet Protocol (IP) address to the WCD to facilitate such wireless packet-data communication. With this arrangement, a WCD within coverage of the WAP may engage in air interface communication with the WAP and may thereby communicate via the WAP with various remote network entities or with other WCDs. In general, the wireless access network may operate in accordance with a particular radio access technology or "air interface protocol," such as various Wireless Local Area Network (WLAN) protocols (e.g., IEEE 802.11 (WiFi) protocols), among others. Such connectivity to a packet-switched network may facilitate communication services such as Voice over Internet Protocol (VoIP) based call connections, and other packet-based real-time media services (e.g., video sessions, etc.).

As WCDs are typically mobile, it has become standard practice to provide location-based services keyed to WCD location. To engage in these services, a WCD may report its location to a location-based service provider (LBSP) to enable the LBSP to provide a location based service based on the provided location. Examples of such services take various forms, including, without limitation, providing navigation guidance and information about points of interest, tracking packages or other objects, locating lost or stolen WCDs, and providing emergency response service (e.g., 911 call routing and dispatching of emergency personnel). In one example, when a WCD is being served by a WAP, the WCD may report to an LBSP as the WCD's location a representative location of the WAP. Such a location may be a street address, geographic coordinates of the WAP, or some other information indicative of location. In such an example, when the WCD requests the location-based service from the LBSP, the WCD reports the representative location of the WAP as the WCD's location, and the LBSP takes action (e.g., providing information, dispatching assistance, etc.) based on that location.

OVERVIEW

In practice, an LBSP could learn the location of a WCD in a variety of ways. For example, the LBSP could receive from the WCD itself a report of the WCD's location. As another example, when the WCD is being served by a wireless network, the LBSP could receive from a location-determination platform associated with that wireless network a report of the WCD's location as determined by the platform. As yet another example, as discussed above, when the WCD is being served by a WAP, the WCD may report to the LBSP as the WCD's location a representative location of the WAP. In such an example, the WCD may transmit a request for location information to the WAP when the WCD requests a location-based service, and the WAP may provide such information to the WCD. To do so, the WAP may have stored a location of the WAP and may be configured to report the stored location to the WCD in response to the request for location information. The WCD may then be configured to relay the reported stored location of the WAP to the LBSP to facilitate the location-based service.

In one particular example, a user may use the WCD to place a VoIP call to an LBSP while being served by the WAP. For example, a user may place a VoIP call to an emergency services provider to receive emergency services at the WCD's location. When setting up the VoIP call, the WCD may transmit a request for location information to the WAP, and the WAP may be configured to report a stored location of the WAP to the WCD in response to the request for location information. In such an example, while the WCD is being served by the WAP, the WCD may use SIP signaling to set up the VoIP call to the emergency services provider. For instance, the WCD may generate and transmit a SIP INVITE message to set up the VoIP call. Such a SIP INVITE message transmitted by the WCD generally functions to invoke initiation of a Real-time Transport Protocol (RTP) session between the WCD and the emergency services provider. As such, the WCD may include in its SIP INVITE message an indication of the reported stored location of the WAP as a representative location of the WCD. The emergency services provider may then receive the SIP INVITE message, and respond with a SIP 200 OK message. And the WCD may then send a SIP ACK message to the emergency services provider, completing establishment of an RTP session, and thereby allowing the emergency services provider to communicate with a user of the WCD. Further, the emergency services provider may use the received indication of the stored location of the WAP to provide dispatch emergency services to that location.

In one example, the WAP used to serve the WCD may be a portable WAP, such as a portable WiFi (e.g., IEEE 802.11) access point, or a portable cellular base station, such as a femtocell. As the WAP may be portable, a user who owns and/or operates such a portable WAP may move the WAP from one location to another. For instance, the user may move residences from a first residence to a second residence, and take the portable WAP to the second residence. Subsequently, the user may connect the portable WAP to a router on a LAN at the second residence to facilitate connectivity to a packet-switched network. In one example, the second residence may be a significant distance from the first residence (e.g., several states away). Thus, when the user moves the portable WAP to the second residence, the portable WAP may have an incorrect location (e.g., the street address for the first residence) stored in its data storage. As a result, when the user uses the portable WAP to request a location-based service while the WCD is being served by the portable WAP at the second location, the location information that is passed to the LBSP would be incorrect, which could result in failure of LBSP (e.g., emergency service personnel) to properly assist the user. Disclosed herein are methods and systems to help avoid this type of problem.

To address such an issue, the portable WAP may use identities of nearby cellular base stations as a basis to determine if the WAP's stored location is still correct. In particular, when a WCD is within coverage of the portable WAP, the WCD may report to the portable WAP the identities of cellular base stations currently accessible by the WCD. Thereafter, again when the WCD is within coverage of the portable WAP, the WCD may again report to the portable WAP the identities of cellular base stations currently accessible by the WCD. If the identities of reported nearly cellular base stations change a threshold amount, the portable WAP may deem its stored location to be possibly incorrect. In response to such a determination, the portable WAP may prompt a user to enter a new WAP location, or otherwise take action to update/correct the stored WAP location.

As a particular example, when the WCD is within coverage of the portable WAP, the portable WAP receives from the WCD a first list of one or more cellular base stations currently accessible by the WCD. In a later instance, when the WCD is again within coverage of the portable WAP, the portable WAP receives from the WCD a second list of one or more cellular base stations currently accessible by the WCD. If the portable WAP determines that the second list of one or more cellular base stations is threshold similar to the first list of one or more cellular base stations, then the portable WAP would thereby deem the stored WAP location to be accurate. Whereas, if the portable WAP determines that second list of one or more cellular base stations is threshold different than the first list of one or more cellular base stations, then the portable WAP would thereby conclude that the stored WAP location is suspect, and the portable WAP may responsively prompt a user to enter a new location for the portable WAP. The portable WAP may then store the new location in its data storage and report the new location to the WCD when the WCD is within coverage of the portable WAP and the WCD requests a location-based service.

In practice, the portable WAP may perform this comparison of the first list of one or more cellular base stations to the second list of one or more cellular base stations in response to the WCD seeking to invoke/request a location-based service. In particular, the WCD may transmit a request for location information to the WAP when the WCD requests a location-based service. When the WCD requests the location-based service, if the portable WAP determines that the second list of one or more cellular base stations is threshold different than the first list of one or more cellular base stations, then the portable WAP may forgo sending to the WCD the WAP location that the portable WAP has stored. Further, the portable WAP may prompt a user to enter a new WAP location, and the portable WAP may store that newly entered WAP location and may report that newly entered WAP location, rather than the previously stored WAP location, to the WCD, to facilitate the location-based service.

Thus, in one respect, disclosed is a method for controlling reporting of location to an LBSP to facilitate implementation of a location-based service for a WCD. In accordance with the method, a portable WAP stores a location of the portable WAP and is configured to report the stored location to the WCD when the WCD is within coverage of the portable WAP and requests the location-based service from the LBSP. While the WCD is within coverage of the portable WAP, the portable WAP receives from the WCD a first list of one or more cellular base stations currently accessible by the WCD. Thereafter, while the WCD is again within coverage of the portable WAP, the portable WAP receives from the WCD a second list of one or more cellular base stations currently accessible by the WCD. The portable WAP then compares the first list of one or more cellular base stations to the second list of one or more cellular base stations. In response to determining that the second list of one or more cellular base stations is threshold different from the first list of one or more cellular base stations, the portable WAP reconfigures itself such that, when the WCD requests the location-based service, the portable WAP does not report the stored location to the WCD.

In another respect, disclosed is a method of controlling implementation of a location-based service for a WCD, where a portable WAP provides wireless coverage in which to serve the WCD. The method may involve storing a location of the portable WAP for use to facilitate a location-based service when the WCD is within coverage of the portable WAP. Further, the method may also involve, when the WCD is within coverage of the portable WAP, the portable WAP receiving from the WCD a first list of one or more cellular base stations currently accessible by the WCD. And still further, the method may involve, thereafter, when the WCD is subsequently again within coverage of the portable WAP, the portable WAP (i) receiving from the WCD a second list of one or more cellular base stations currently accessible by the WCD, (ii) comparing the first list of one or more cellular base stations to the second list of one or more cellular base stations, (iii) determining, based on the comparison, that the second list of one or more cellular base stations is threshold different from the first list of one or more cellular base stations, and (iv) responsive to the determining, foregoing transmitting the stored location of the portable WAP to the WCD when the WCD requests the location-based service.

And in still another respect, disclosed is a portable WAP configured to control implementation of a location-based service. Such a portable WAP may include a wireless-communication interface and a controller configured to cause the portable WAP to carry out operations. The operations may include storing a location of the portable WAP. The operations may further include, while a WCD is within coverage of the portable WAP, receiving via the wireless-communication interface from the WCD a first list of one or more cellular base stations currently accessible by the WCD. The operations may further include, thereafter, while the WCD is again within coverage of the portable WAP, receiving via the wireless-communication interface from the WCD a second list of one or more cellular base stations currently accessible by the WCD. Further, the operations may include comparing the first list of one or more cellular base stations to the second list of one or more cellular base stations. Further still, the operations may include, responsive to determining that the second list of one or more cellular base stations is threshold different from the first list of one or more cellular base stations, foregoing transmitting the stored location of the portable WAP to the WCD when the WCD requests the location-based service.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
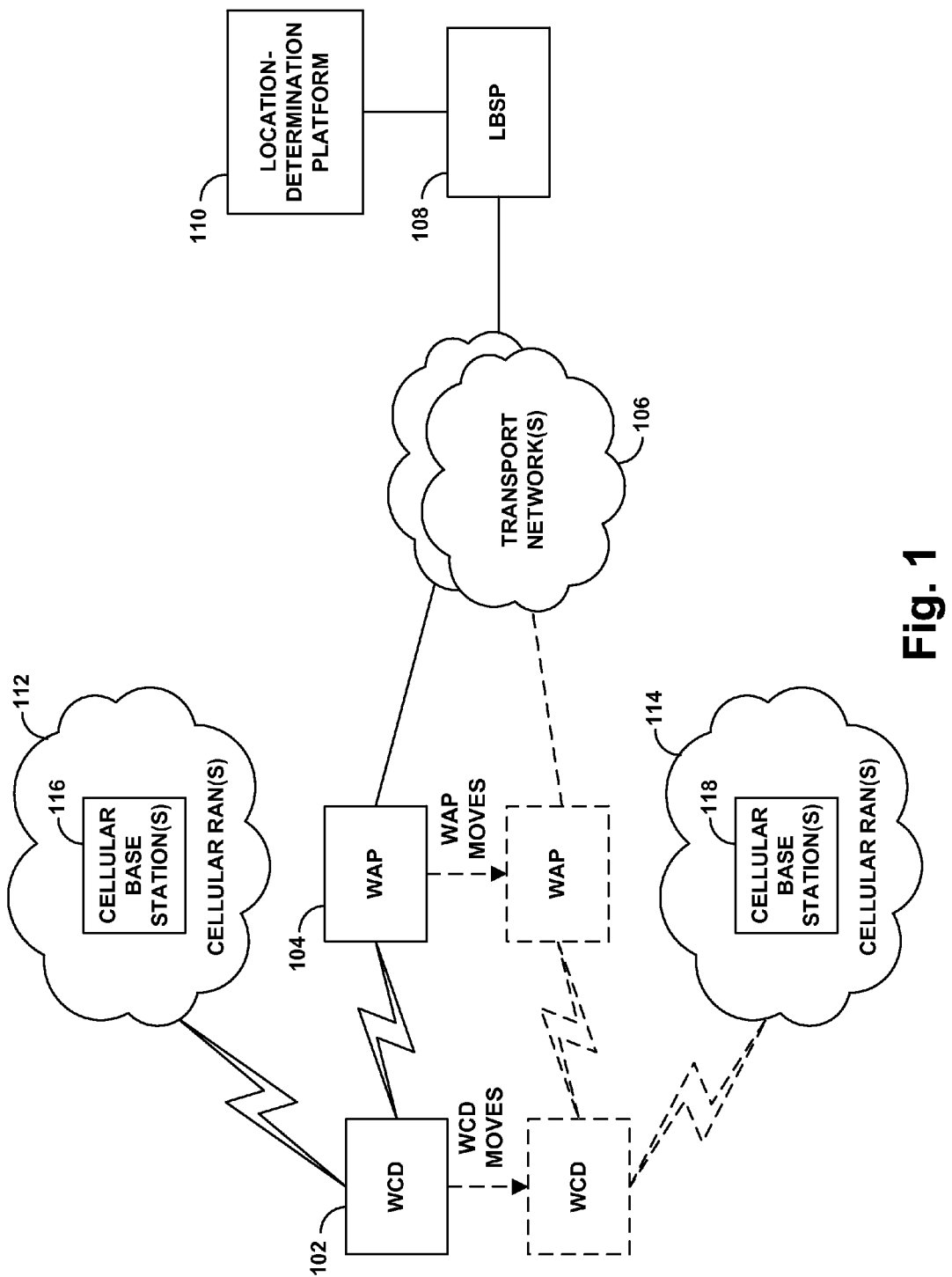
FIG. 1 is a simplified block diagram of an example wireless network in which principles of the present disclosure can be implemented.

Referring to the drawings, FIG. 1 is a simplified block diagram of an example wireless network in which embodiments of the present method and apparatus can be implemented. It should be understood, however, that these and other arrangements described herein are set forth for purposes of example only and that numerous variations are possible. For instance, elements, arrangements, and functions may be added, removed, combined, distributed, or otherwise modified. In addition, it will be understood that features described here as being performed or provided by one or more entities may be implemented in various ways, such as by a processor executing programmed instructions for instance.

As shown in FIG. 1, the example wireless network includes a representative WCD 102 within coverage of a portable WAP 104. The WCD 102 may be any device that is equipped to engage in wireless communication and to carry out various WCD functions described herein. By way of example, the WCD 102 may be a cell phone, or wirelessly-equipped tablet, computer, tracking device, appliance, embedded wireless module, or other wirelessly-equipped device of a type now known or later developed. The portable WAP 104 may be a portable WiFi (e.g., IEEE 802.11) access point, or a portable cellular base station, such as a femtocell. Other examples are possible as well. The portable WAP 104 may be coupled with network infrastructure that provides connectivity with one or more transport networks 106, such as the PSTN or the Internet for instance. For example, the portable WAP 104 may be connected to a router on a LAN, which is served by an Internet Service Provider (ISP) that provides connectivity with the one or more transport networks 106. In practice, the portable WAP 104 may have a unique coverage identifier, such as a service set identifier (SSID) or a MAC address, as examples. Such a coverage identifier may be detected by the WCD 102 when the WCD 102 is within coverage of the portable WAP 104, and the WCD 102 may associate with the portable WAP 104 using the coverage identifier to engage in air interface communication with the portable WAP 104. The WCD 102 may then communicate via the portable WAP 104 with various remote network entities or with other WCDs.

Shown accessible via at least one transport network 106 is an example LBSP 108, which could be an emergency services network (e.g., including a public safety answering point (PSAP)), a navigation server, or any other type of LBSP configured to provide at least one location-based service keyed to the location of WCD 102. With the arrangement of FIG. 1, LBSP 108 may seek to provide a location-based service keyed to the location of WCD 102 and may thus need to determine the location of the WCD 102 to facilitate providing that service. For simplicity, the remainder of this description will address the scenario where the LBSP 108 is a PSAP (or more generally an emergency services system) that the WCD 102 calls or otherwise contacts to request emergency assistance, in which case the LBSP 108 would need to determine the WCD's location in order to facilitate dispatching emergency assistance to that location. It should be understood, however, that the principles discussed in this document can apply as well in numerous other situations where location of a WCD may be used to facilitate providing a location-based service.

In line with the discussion above, the LBSP 108 (PSAP) may learn the location of the WCD 102 in various ways. By way of example, the LBSP 108 could receive an indication of the WCD's location from the WCD 102 itself. For instance, if the WCD 102 engages in SIP or other such signaling to set up a VoIP call to the LBSP 108, the WCD 102 could include an indication of its location in that signaling so that the LBSP 108 receives the indication at the time of the call setup. As another example, the LBSP 108 could receive an indication of the WCD's location from a location-determination platform 110, which could receive an indication of the WCD's location from the WCD 102 or could determine the WCD's location in various other ways. In the scenario where the LBSP 108 obtains the WCD's location from the location-determination platform 110, the LBSP 108 could request and receive the location, or the location-determination platform 110 could push the information to the LBSP 108.

As yet another example, as discussed above, when the WCD 102 is being served by the portable WAP 104 and when the WCD 102 requests a location-based service, the WCD 102 may report to the LBSP 108 as the WCD's location a representative location of the portable WAP 104. In such an example, the WCD 102 may transmit a request for location information to the portable WAP 104 when the WCD 102 requests a location-based service from the LBSP 108, and the portable WAP 104 may provide such information to the WCD 102. To do so, the portable WAP 104 may have stored a location of the portable WAP 104 and may be configured to report the stored location to the WCD 102 in response to the request for location information. The WCD 102 may then be configured to relay the reported stored location of the portable WAP 104 to the LBSP 108 to facilitate the location-based service.

As shown in FIG. 1, the portable WAP 104 may be moved to a second location. However, the portable WAP 104 may still have stored the original location for the portable WAP 104. As a result, when a user uses the portable WAP 104 to request a location-based service while the WCD 102 is being served by the portable WAP 104 at the second location, the location information that is passed to the LBSP 108 would be incorrect, which could result in failure of LBSP 108 to properly assist the user.

To address this issue, the portable WAP 104 may use cellular coverage as a basis to verify the stored WAP location. As shown in FIG. 1, the example wireless network includes cellular radio access network(s) (RAN(s)) 112 and 114, including cellular base stations 116 and 118 (e.g., base transceiver stations (BTS), access nodes, node-Bs, eNodeBs (eNB), or the like) that radiate to define a number of cells or cell sectors. These cells or cell sectors represent cellular coverage areas in which the RAN(s) may serve the WCD 102. These cells or cell sectors may extend to the location where the portable WAP 104 is located. Further, cellular base stations 116 and 118 may be configured to provide wireless service in accordance with one or more air interface protocols, examples of which include Orthogonal Frequency Division Multiple Access (OFDMA) (e.g., Long Term Evolution (LTE)), Code Division Multiple Access (CDMA), Global System for Mobile Communication (GSM), and/or others now known or later developed. Each protocol may define its own procedures and parameters related to air interface communication.

In practice, in each coverage area provided by a particular cellular base station, the cellular base station may broadcast a pilot signal (e.g., reference signal) that WCDs such as WCD 102 can monitor as basis to detect coverage and evaluate coverage strength. Further, each coverage area may have a respective coverage area identifier, such as a Physical Cell Identity (PCI) and/or pseudo-noise offset (PN offset) for instance, which could be encoded in or otherwise represented by the pilot signal broadcast in the coverage area and/or by associated signaling, possibly in combination with an identifier of the base station that provides the coverage area. Thus, the WCD 102 may monitor pilot signals to detect and evaluate coverage strength and may further determine the identity of the coverage area corresponding to the WCD's current location. As shown in FIG. 1, there would be different cellular coverage at the WCD's different locations, and thus there would be different coverage area identifiers. Such various cellular coverage areas could be provided by the same or different cellular service providers. For example, cellular RAN(s) 112 may be owned and operated by a first cellular service provider, while cellular RAN(s) 114 may be owned and operated by a second cellular service provider. In another example, cellular RAN(s) 112 and 114 may be owned and operated by the same cellular service provider.

The WCD 102 may be configured to detect cellular coverage where the portable WAP 104 is located, and the portable WAP 104 may be configured to receive information indicative of such detected cellular coverage from the WCD 102. The portable WAP 104 may then use that cellular coverage information as a basis to validate a stored WAP location. The WCD 102 may scan for such coverage (and the portable WAP 104 may be configured to receive information indicative of such coverage) in a variety of ways. In one example, the WCD 102 may scan for such cellular coverage each time the WCD 102 seeks to place a VoIP call using the portable WAP 104. For example, a user may place a VoIP call to an emergency services provider to receive emergency services at the WCD's location. When setting up the VoIP call to the emergency services provider (or any location-based service), the WCD 102 may transmit a request for location information to the portable WAP 104. In response, the portable WAP 104 may request that the WCD 102 transmit a list of one or more cellular base stations currently accessible by the WCD 102 to the portable WAP 104. The portable WAP 104 may then use the received list of cellular base stations as a basis to validate the stored WAP location.

For example, in a first instance, when the WCD 102 is within coverage of the portable WAP 104, the portable WAP receives from the WCD 102 a first list of one or more cellular base stations currently accessible by the WCD 102. In a later instance, when the WCD 102 is again within coverage of the portable WAP 104, the portable WAP 104 receives from the WCD 102 a second list of one or more cellular base stations currently accessible by the WCD 102. The portable WAP 104 may be configured to receive the second list of one or more cellular base stations in response to the WCD again requesting a location-based service from the LBSP 108. The portable WAP 104 may then compare the first list of one or more cellular base stations to the second list of one or more cellular base stations. If the portable WAP 104 finds that the identities of the cellular base stations on the second list are threshold similar to the identities of the cellular base stations on the first list, then the portable WAP 104 would thereby deem the stored WAP location to be valid. Whereas, if the portable WAP finds that the identities of the cellular base stations on the second list are threshold different from the identities of the cellular base stations on the first list, then the portable WAP 104 would thereby conclude that the stored WAP location is suspect, and the portable WAP 104 may responsively prompt a user to enter a new location for the portable WAP 104.

In a particular example as illustrated in FIG. 1, the portable WAP 104 is initially at a first location. At the first location, while the WCD 102 is within coverage of the portable WAP 104, the WCD 102 detects one or more coverage area identifiers corresponding to cellular base station(s) 116. The WCD 102 may then transmit a first list of the cellular base stations (s) 116 to the portable WAP 104. Subsequently, the portable WAP 104 may be moved to a second location. When the WCD 102 is within coverage of the portable WAP 104 at the second location, the WCD 102 may again scan for cellular coverage. Since the WCD 102 has moved to the second location, the WCD 102 detects one or more coverage area identifiers corresponding to base station(s) 118. The WCD 102 may then transmit a second list of the cellular base station(s) 118 to the portable WAP 104, and the portable WAP 104 may compare the second list to the first list. In the example shown in FIG. 1, the portable WAP 104 determines that the second list of cellular base station(s) 118 is threshold different from the first list of cellular base station(s) 116. In response, the portable WAP 104 determines that the stored WAP location is suspect.

In practice, the portable WAP may receive an updated list of cellular base stations accessible by the WCD 102 in response to the WCD 102 seeking to invoke/request a location-based service. At that time, if the portable WAP 104 determines that the WCD 102 is not within the same cellular coverage that the portable WAP 104 has correlated with the stored location of the portable WAP 104, then the portable WAP 104 may responsively forgo sending to the WCD 102 the WAP location that the portable WAP 104 has stored. Further, the portable WAP 104 may responsively prompt a user to enter a new WAP location, and the portable WAP 104 may report that newly entered WAP location, rather than the previously stored WAP location, to the WCD 102, to facilitate the location-based service.

Figure 2:
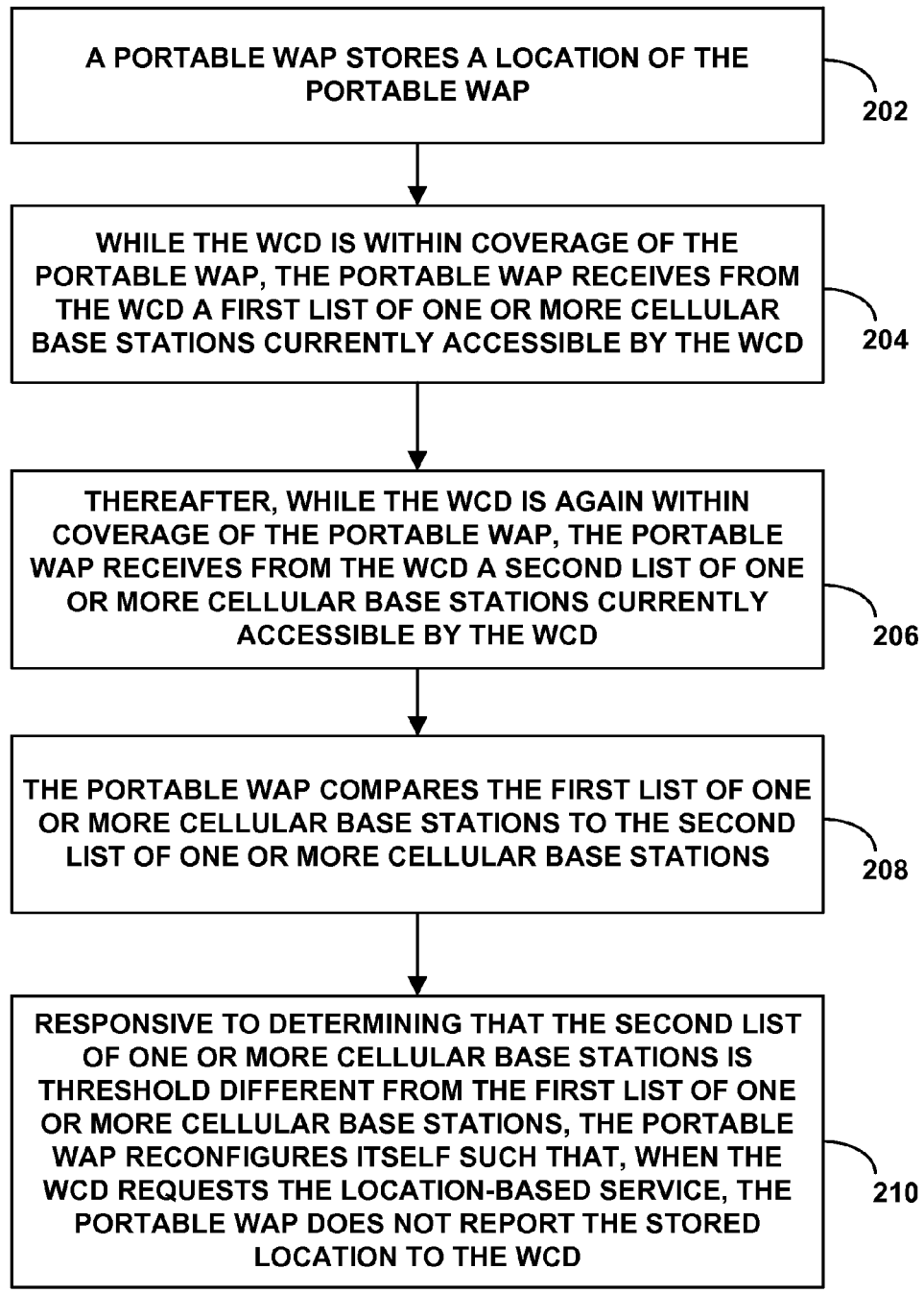
FIG. 2 is a flow chart depicting operations that can be carried out in accordance with the disclosure.

FIG. 2 is a flow chart depicting example operations that can be carried out in accordance with this disclosure, to control reporting of location to an LBSP to facilitate implementation of a location-based service for a WCD. The portable WAP is configured (e.g., programmed) to report the stored location of the portable WAP to the WCD when the WCD is within coverage of the portable WAP and requests the location-based service from the LBSP. As discussed above, the stored location may be a street address, or geographic coordinates of the portable WAP, or some other information indicative of location. The location may be stored in data storage of the portable WAP. As shown in FIG. 2, at block 202, the portable WAP stores a location of the portable WAP. The stored location may be entered by a user via a user interface of the portable WAP, or the user may enter the stored location via a WCD in communication with the portable WAP. Other examples are possible as well. As discussed above, the WCD may transmit a request for location information to the portable WAP when the WCD requests a location-based service from the LBSP, and the portable WAP may provide the stored location of the portable WAP to the WCD. The WCD may be configured to relay the reported stored location of the portable WAP to the LBSP to facilitate the location-based service.

At block 204, while the WCD is within coverage of the portable WAP, the portable WAP receives from the WCD a first list of one or more cellular base stations currently accessible by the WCD. As discussed above, the portable WAP may be configured to receive the first list of one or more cellular base stations in response to the WCD requesting a location-based service from the LBSP. The portable WAP may receive the first list via a wireless-communication interface, for example. At block 206, thereafter, while the WCD is again within coverage of the portable WAP, the portable WAP receives from the WCD a second list of one or more cellular base stations currently accessible by the WCD. As discussed above, the portable WAP may be configured to receive the second list of one or more cellular base stations in response to the WCD again requesting a location-based service from the LBSP. In one example, each of the first list of one or more cellular base stations and the second list of one or more cellular base stations includes one or more coverage area identifiers. In such an example, each coverage area identifier of the one or more coverage area identifiers may include one or more PCIs or one or more PN offsets, for instance.

At block 208, the portable WAP compares the first list of one or more cellular base stations to the second list of one or more cellular base stations. At block 210, responsive to determining that the second list of one or more cellular base stations is threshold different from the first list of one or more cellular base stations, the portable WAP reconfigures itself such that the portable WAP does not report the stored location to the WCD.

In one embodiment, the first list of one or more cellular base stations comprises a plurality of cellular base stations detected by the WCD while within coverage of the portable WAP. For instance, if the WCD is initially in an area of overlap between three cellular coverage areas, the first list of one or more cellular base stations may include three cellular base stations. Similarly, the second list of one or more cellular base stations may comprise a plurality of cellular base stations detected by the WCD while within coverage of the portable WAP. The portable WAP may compare each cellular base station in the first list to each cellular base station in the second list. In such an example, the portable WAP may determine that the second list is threshold different from the first list if each of the cellular base stations in the second list does not match each of the cellular base stations in the first list.

Further, the portable WAP may determine a level of confidence in its comparison between first list of one or more cellular base stations and the second list of one or more cellular base stations. For instance, in the scenario noted above with the first list including three cellular base stations, there would be a high level of confidence if each of the three cellular base stations matches in the WCD's comparison between the first list of one or more cellular base stations and the second list of one or more cellular base stations. The level of confidence may be represented by a percentage, for example. Thus, if each of the three coverage areas matches, the level of confidence would be 100%. If one of the three cellular base stations does not match, the level of confidence would be 66%. If two of the three cellular base stations do not match, the level of confidence would be 33%. Further, if none of the three cellular base stations match, the level of confidence would be 0%.

Further, the portable WAP may use cellular service provider information as a basis to further confirm a change in location of the portable WAP. Such a determination may be useful since a WCD may detect a first set of cellular base stations associated with a first cellular service provider at a location, while the WCD may thereafter detect a second set of cellular base stations associated with a second cellular service provider at the same location. Therefore, the portable WAP may use cellular service provider information as an additional factor in determining that the first list of one or more cellular base stations is threshold different from the second list of one or more cellular base stations. In particular, the first list of one or more one or more cellular base stations may include an indication of a first cellular service provider associated with the first list of one or more cellular base stations. Similarly, the second list of one or more cellular base stations may include an indication of a second cellular service provider associated with the second list of one or more cellular base stations. In such an example, the portable WAP may compare the first cellular service provider to the second cellular service provider in addition to comparing the first list of one or more cellular base stations to the second list of one or more cellular base stations. If the portable WAP determines that the second list is threshold different from the first list and further determines that the first service provider is the same as the second service provider, the portable WAP may then responsively reconfigure itself to not report the stored location of the portable WAP to the LBSP.

In another example, the portable WAP may determine a time difference between when the portable WAP receives the first list of one or more cellular base stations and when the portable WAP receives the second list of one or more cellular base stations. The WCD may transmit a timestamp along with the transmission of the first list and the second list. The time difference may be used as an additional factor in determining a change in location of the portable WAP. For example, if the portable WAP receives the second list of one or more cellular base stations ten minutes after receiving the first list, it is unlikely the that portable WAP has changed location. However, if the portable WAP receives the second list two days after receiving the first list, it may be more likely that the portable WAP has changed location. In such an example, the portable WAP may reconfigure itself to not report the stored location to the WCD further in response to determining that the time difference exceeds a threshold.

In yet another example, the portable WAP may determine whether the portable WAP has powered down between the time the portable WAP receives the first list of one or more cellular base stations and the time the portable WAP receives the second list of one or more cellular base stations. In particular, a power system of the portable WAP may be in communication with a processor to determine whether the portable WAP has powered down. Typically, a user will power down (e.g., unplug) the portable WAP before moving the portable WAP to a new location. If the portable WAP determines that it has not been powered down in the time period between when it receives the first list and the second list, it is less likely that the portable WAP has changed location. Thus, the portable WAP may determine a first time when the portable WAP receives the first list of one or more cellular base stations, and the portable WAP may further determine a second time when the portable WAP receives the second list of one or more cellular base stations. Further, the portable WAP may determine a third time when the portable WAP was powered down. In such an example, the portable WAP may reconfigure itself to not report the stored location to the WCD further in response to determining that the portable WAP has powered down between the first time and the second time.

Figure 3:
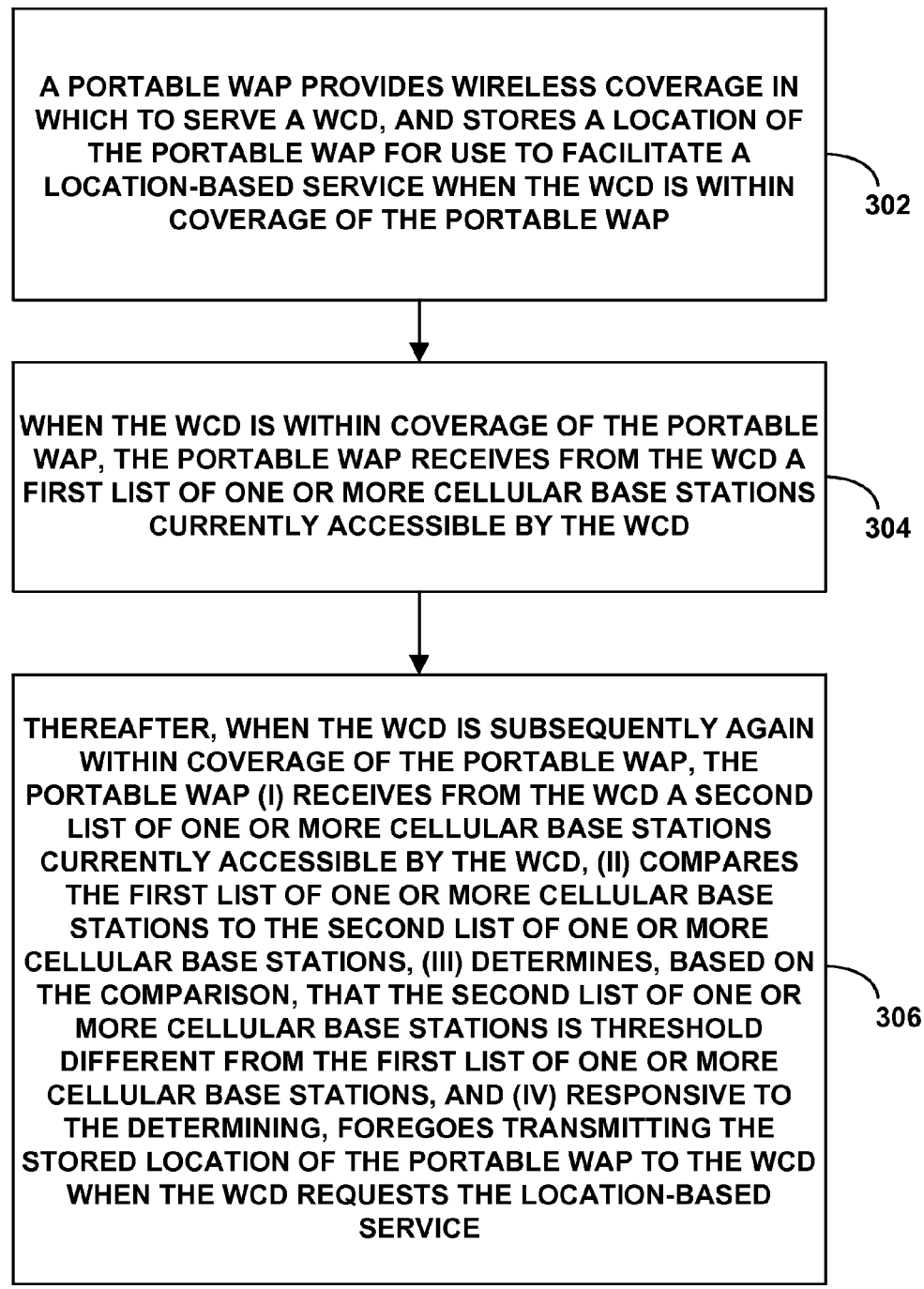
FIG. 3 is another flow chart depicting operations that can be carried out in accordance with the disclosure.

FIG. 3 is next another flow chart depicting operations that can be carried out in accordance with the present disclosure, to control implementation of a location-based service for a WCD. As shown in FIG. 3, at block 302, a portable WAP provides wireless coverage in which to serve a WCD, and the portable WAP stores a location of the portable WAP for use to facilitate a location-based service when the WCD is associated with the portable WAP. In practice, the WCD may transmit a request for location information to the portable WAP when the WCD requests a location-based service. The portable WAP may be configured to report the stored location of the portable WAP to the WCD in response to the request for location information. The WCD may then be configured to transmit the reported stored location of the WAP to the LBSP to facilitate the location-based service.

At block 304, when the WCD is within coverage of the portable WAP, the portable WAP receives from the WCD a first list of one or more cellular base stations currently accessible by the WCD. As discussed above, the portable WAP may be configured to receive the first list of one or more cellular base stations in response to the WCD requesting a location-based service from the LBSP. At block 306, thereafter, when the WCD is subsequently again within coverage of the portable WAP, the portable WAP (i) receives from the WCD a second list of one or more cellular base stations currently accessible by the WCD, (ii) compares the first list of one or more cellular base stations to the second list of one or more cellular base stations, (iii) determines, based on the comparison, that the second list of one or more cellular base stations is threshold different from the first list of one or more cellular base stations, and (iv) responsive to the determining, forgoes transmitting the stored location of the portable WAP to the WCD. As discussed above, the portable WAP may be configured to receive the second list of one or more cellular base stations in response to the WCD again requesting a location-based service from the LBSP.

Further, the portable WAP may transmit to the WCD an indication that the stored location is incorrect rather than the portable WAP transmitting the stored location of the portable WAP to the WCD. In one example, the portable WAP may include a statistical certainty measure of the indication that the stored location is incorrect. For example, the portable WAP may include the level of confidence as the statistical certainty measure, as discussed above. In another example, in response to the portable WAP forgoing transmitting the stored location, the location-based provider may then process a request for location-based services as if no location was provided, for example by requesting a user to provide location information.

In one example, rather than the portable WAP transmitting the stored location of the portable WAP to the WCD, the portable WAP may output, on a user interface of the portable WAP, a prompt for user entry of a new location of the portable WAP. The new location could be a street address, geographic coordinates, or some other information indicative of location. The portable WAP may, in response to the prompt, receive the user entry of a current location of the portable WAP as the new location. The portable WAP may then store, in place of an incorrect location of the portable WAP, the received new location of the portable WAP. Finally, the portable WAP may then provide the received new location of the portable WAP, rather than the incorrect location of the portable WAP, to facilitate the location-based service.

Figure 4:
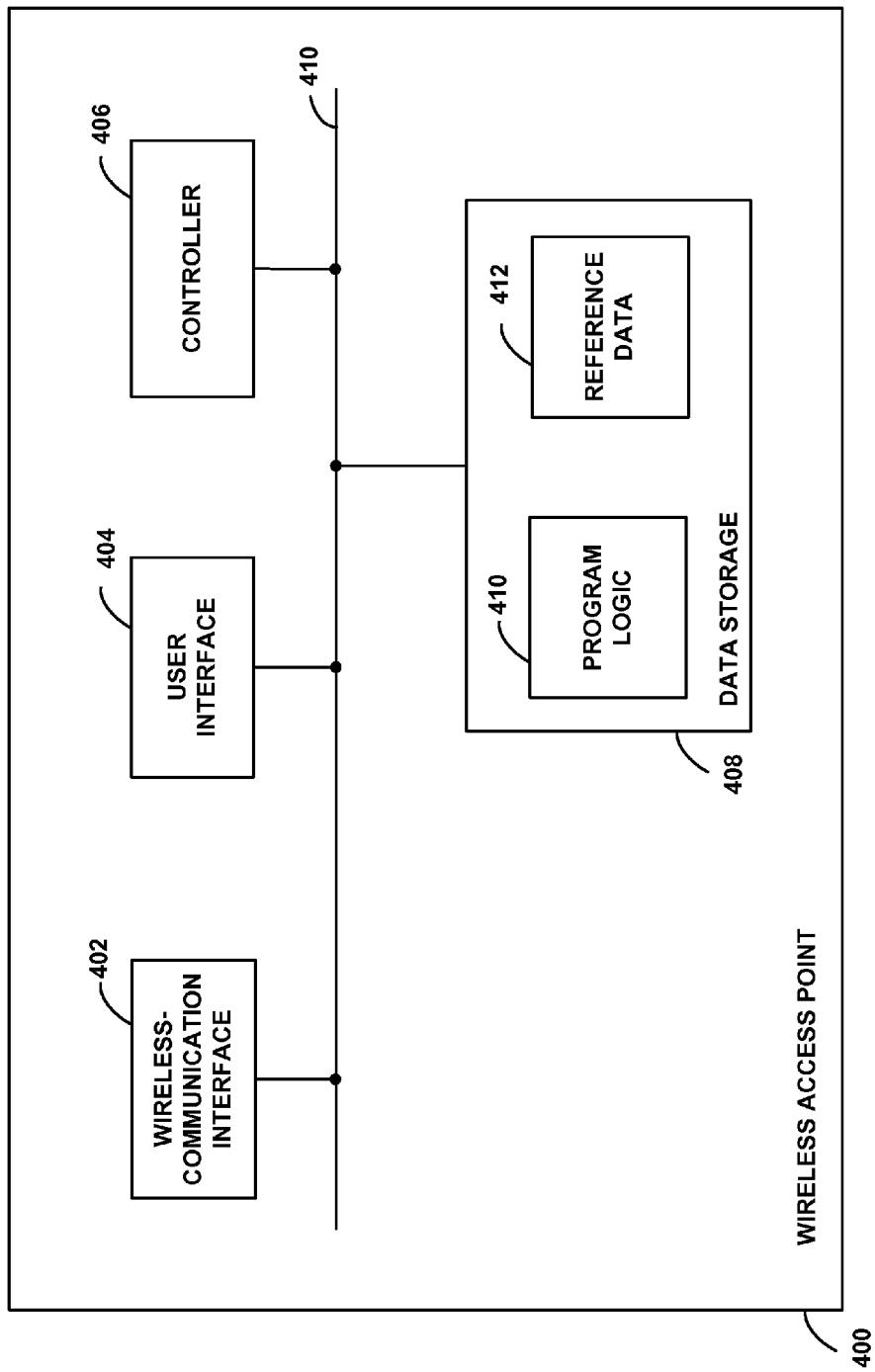
FIG. 4 is a simplified block diagram of an example wireless access point (WAP) operable in accordance with the disclosure.

Those skilled in the art will appreciate that there can be numerous specific implementations of a WAP that may be used in connection with at least one embodiment of the method described herein. By way of example, FIG. 4 is a simplified block diagram of a WAP 400, showing functional components that can be included in such a device to facilitate implementation of at least one embodiment.

As shown, the example WAP 400 includes a wireless-communication interface 402, a user interface 404, a controller 406, and data storage 408, all of which may be coupled together by a system bus, network, or other connection mechanism 410.

Wireless-communication interface 402 may be or include any combination of hardware and software modules that WAP 400 uses to communicate with one or more other entities. As such, wireless-communication interface 402 may have one or more chipsets suitable for wireless communication, and/or one or more other components suitable for engaging in data communication. For instance, wireless-communication interface 402 may operate in compliance with one of the air-interface protocols (e.g., IEEE 802.11) noted above.

User interface 404 may include one or more input and/or output components to facilitate interaction with a user of the device. As such, the user interface may include input components such as a keypad, touchpad, touch-sensitive display, microphone, and camera, and the user interface may further include output components such as a display screen and a sound speaker or headset jack. Other input and output components are possible as well.

Controller 406 may include one or more general purpose processors (e.g., microprocessors) and/or one or more special purpose processors (e.g., digital signal processors, application specific integrated circuits, etc.) and may be integrated in whole or in part with wireless-communication interface 402 and/or other components of the WAP 400.

Data storage 408 may include one or more volatile and/or non-volatile storage components, such as optical, magnetic, flash, or other storage components, and may be integrated in whole or in part with the controller 406. Data storage 408 may include any type of non-transitory computer-readable medium or media, such as a storage device that includes a disk and/or a hard drive, as examples. The computer-readable medium may include media arranged to store data for short periods of time, such as register memory, processor cache, and/or random access memory (RAM), as examples. The computer-readable medium may also or instead include media arranged to serve as secondary or more persistent long-term storage, such as read only memory (ROM), optical disks, and/or magnetic disks, as examples. The computer-readable media may also or instead include any other volatile and/or non-volatile storage system or systems deemed suitable for a given implementation.

As shown, representative data storage 408 includes program logic 410 and reference data 412. Program logic 410 may include instructions executable by controller 406 to carry out various functions described herein. The non-transitory data storage 408 may also hold reference data 412 for use in accordance with the present method, such as a stored location of the WAP 400, a first list of one or more cellular base stations accessible by a WCD, and a second list of one or more cellular base stations accessible by the WCD.

These various elements may be integrated together, distributed, or modified in various ways, and the WAP may have more or fewer elements than these.

While exemplary embodiments have been described, persons of skill in the art will appreciate that variations may be made without departure from the scope and spirit of the invention. This true scope and spirit is defined by the appended claims, which may be interpreted in light of the foregoing.

We claim:

1. A method for controlling reporting of location to a location-based service provider (LBSP) to facilitate implementation of a location-based service for a wireless communication device (WCD), wherein a portable wireless access point (WAP) stores a location of the portable WAP and is configured to report the stored location to the WCD when the WCD is within coverage of the portable WAP and requests the location-based service from the LBSP, the method comprising:

while the WCD is within coverage of the portable WAP, the portable WAP receiving from the WCD a first list of one or more cellular base stations currently accessible by the WCD;

thereafter, while the WCD is again within coverage of the portable WAP, the portable WAP receiving from the WCD a second list of one or more cellular base stations currently accessible by the WCD;

comparing, by the portable WAP, the first list of one or more cellular base stations to the second lit of one or more cellular base stations; and responsive to determining that a difference between the first list of one or more cellular base stations and the second list of one or more base stations exceeds a threshold, the portable WAP reconfiguring itself such that, when the WCD requests the location-based service, the portable WAP does not report the stored location to the WCD.

2. The method of claim 1, wherein determining that a difference between the first list of one or more cellular base stations and the second list of one or more base stations exceeds a threshold comprises:
   determining that each cellular base station in the first list of one or more cellular base stations does not match each cellular base station in the second list of one or more cellular base stations.

3. The method of claim 1, wherein each of the first list of one or more cellular base stations and the second list of one or more cellular base stations includes one or more coverage area identifiers corresponding to a given cellular base station of the one or more cellular base stations.

4. The method of claim 3, wherein each coverage area identifier of the one or more coverage area identifiers is selected from the group consisting of a Physical Cell Identity (PCI) and a pseudo-noise (PN) offset.

5. The method of claim 1, wherein the portable WAP reconfiguring itself to not report the stored location to the WCD when the WCD requests the location-based service comprises:
   when the WCD requests the location-based service, transmitting to the WCD an indication that the stored location is incorrect.

6. The method of claim 5, wherein transmitting to the WCD the indication that the stored location is incorrect comprises including in the transmission to the WCD a statistical certainty measure of the indication that the stored location is incorrect.

7. The method of claim 1, wherein the stored location of the portable WAP is a first location of the portable WAP, and wherein the portable WAP reconfiguring itself to not report the stored location to the WCD when the WCD requests the location-based service comprises:
   outputting by the portable WAP a prompt for user entry of a second location of the portable WAP;
   receiving by the portable WAP, in response to the prompt, the user entry of a current location of the portable WAP as the second location;
   storing by the portable WAP, in place of the first location of the portable WAP, the received second location of the portable WAP; and
   providing by the portable WAP the received second location of the portable WAP to the location-based service, rather than the first location of the portable WAP.

8. The method of claim 1, wherein the LBSP is an emergency service provider, and wherein the location-based service is emergency service.

9. The method of claim 1, wherein the first list of one or more cellular base stations includes an indication of a first cellular service provider associated with the first list of one or more cellular base stations, wherein the second list of one or more cellular base stations includes an indication of a second cellular service provider associated with the second list of one or more cellular base stations, and wherein the portable WAP reconfigures itself to not report the stored location to the WCD when the WCD requests the location-based service further in response to determining that the first cellular service provider is the same as the second cellular service provider.

10. The method of claim 1, wherein the portable WAP determines a time difference between when the portable WAP receives the first list of one or more cellular base stations and when the portable WAP receives the second list of one or more cellular base stations, and wherein the portable WAP reconfigures itself to not report the stored location to the WCD when the WCD requests the location-based service further in response to determining that the time difference exceeds a threshold.

11. The method of claim 1, wherein the portable WAP determines a first time when the portable WAP receives the first list of one or more cellular base stations, wherein the portable WAP determines a second time when the portable WAP receives the second list of one or more cellular base stations, and wherein the portable WAP reconfigures itself to not report the stored location to the WCD when the WCD requests the location-based service further in response to determining that the portable WAP has powered down between the first time and the second time.

12. A method of controlling implementation of a location-based service for a wireless communication device (WCD), wherein a portable wireless access point (WAP) provides wireless coverage in which to serve the WCD, the method comprising:
   storing by the portable WAP a location of the portable WAP for use to facilitate a location-based service when the WCD is within coverage of the portable WAP;
   when the WCD is within coverage of the portable WAP, the portable WAP receiving from the WCD a first list of one or more cellular base stations currently accessible by the WCD;
   and
   thereafter, when the WCD is subsequently again within coverage of the portable WAP, the portable WAP (i) receiving from the WCD a second list of one or more cellular base stations currently accessible by the WCD, (ii) comparing the first list of one or more cellular base stations to the second list of one or more cellular base stations, (iii) determining, based on the comparison, that a difference between the first list of one or more cellular base stations and the second list of one or more base stations exceeds a threshold, and (iv) responsive to the determining, foregoing transmitting the stored location of the portable WAP to the WCD when the WCD requests the location-based service.

13. The method of claim 12, wherein the portable WAP transmits to a location-based service provider (LBSP) a request for the location-based service, wherein using the stored location of the portable WAP to facilitate the location-based service comprises retrieving the stored location and transmitting the location to the LBSP to enable the LBSP to provide the requested location-based service based on the location.

14. The method of claim 13, further comprising:
   when the WCD requests the location-based service, transmitting to the LBSP an indication that the location is incorrect.

15. The method of claim 14, wherein transmitting to the LBSP the indication that the stored location is incorrect comprises including in the transmission to the LBSP a statistical certainty measure of the indication that the stored location is incorrect.

16. The method of claim 12, wherein the stored location of the portable WAP is a first location of the portable WAP, and wherein foregoing transmitting the stored location of the portable WAP to the WCD when the WCD requests the location-based service comprises:
   outputting by the portable WAP a prompt for user entry of a second location of the portable WAP;
   receiving by the portable WAP, in response to the prompt, the user entry of a current location of the portable WAP as the second location;
   storing by the portable WAP, in place of the first location of the portable WAP, the received second location of the portable WAP; and providing by the portable WAP the received second location of the portable WAP to the location-based service, rather than the first location of the portable WAP.

17. The method of claim 16, wherein the portable WAP transmits to an LBSP a request for the location-based service, wherein using the stored first location of the portable WAP to facilitate the location-based service comprises retrieving the stored first location and transmitting the retrieved first location to the LBSP to enable the LBSP to provide the requested location-based service based on the retrieved first location; and wherein using by the portable WAP the received second location of the portable WAP, rather than the retrieved first location of the portable WAP, to facilitate the location-based service comprises transmitting the second location to the LBSP to enable the LBSP to provide the requested location-based service based on the second location.

18. A portable wireless access point (WAP) configured to control implementation of a location-based service, the portable WAP comprising:

a wireless-communication interface; and a controller configured to cause the portable WAP carry out operations comprising:

storing a location of the portable WAP;

while a WCD is within coverage of the portable WAP, receiving via the wireless-communication interface from the WCD a first list of one or more cellular base stations currently accessible by the WCD; thereafter, while the WCD is again within coverage of the portable WAP, receiving via the wireless-communication interface from the WCD a second list of one or more cellular base stations currently accessible by the WCD;

comparing the first list of one or more cellular base stations to the second list of one or more cellular base stations; and responsive to determining that a difference between the first list of one or more cellular base stations and the second list of one or more base stations exceeds a threshold, foregoing transmitting the stored location of the portable WAP to the WCD when the WCD requests the location-based service.

19. The portable WAP of claim 18, wherein the stored location of the portable WAP is a first location of the portable WAP, and wherein causing the portable WAP to forego transmitting the stored location of the portable WAP to the WCD when the WCD requests the location-based service comprises:

outputting by the portable WAP a prompt for user entry of a second location of the portable WAP;

receiving by the portable WAP, in response to the prompt, the user entry of a current location of the portable WAP as the second location;

storing by the portable WAP, in place of the first location of the portable WAP, the received second location of the portable WAP; and providing by the portable WAP the received second location of the portable WAP to the location-based service, rather than the first location of the portable WAP.

20. The portable WAP of claim 19, wherein the portable WAP transmits to an LBSP a request for the location-based service, wherein using the stored first location of the portable WAP to facilitate the location-based service comprises retrieving the stored first location and transmitting the retrieved first location to the LBSP to enable the LBSP to provide the requested location-based service based on the retrieved first location; and wherein using by the portable WAP the received second location of the portable WAP, rather than the retrieved first location of the portable WAP, to facilitate the location-based service comprises transmitting the second location to the LBSP to enable the LBSP to provide the requested location-based service based on the second location.

\* \* \* \* \*